United States Patent [19]

Kimura

[11] Patent Number: 4,894,269
[45] Date of Patent: Jan. 16, 1990

[54] SYSTEM AND METHOD FOR SECURELY AFFIXING AN ELEMENT TO A STRUCTURE

[75] Inventor: Michio Kimura, Nagoya, Japan

[73] Assignee: Nippon Decoluxe Kabushiki Kaisha, Japan

[21] Appl. No.: 127,811

[22] Filed: Dec. 3, 1987

[30] Foreign Application Priority Data

Dec. 5, 1986 [JP] Japan .................................. 61-288938
Dec. 5, 1986 [JP] Japan .................................. 61-288939
Mar. 3, 1987 [JP] Japan .................................. 62-046734

[51] Int. Cl.$^4$ ............................................ B65D 65/28
[52] U.S. Cl. .................................... 428/43; 428/321.5;
206/217; 206/222; 206/568; 465/261
[58] Field of Search .............. 428/43, 321.5; 206/219,
206/282, 568; 405/261

[56] References Cited

U.S. PATENT DOCUMENTS

| | | | |
|---|---|---|---|
| 4,516,884 | 5/1985 | Douty | 206/219 |
| 4,519,866 | 5/1988 | Stol | 428/43 |
| 4,528,792 | 7/1985 | Cross et al. | 206/219 |
| 4,651,875 | 3/1987 | Lang et al. | 206/219 |
| 4,706,806 | 11/1987 | Mauthe | 405/261 |
| 4,729,696 | 3/1988 | Goto et al. | 206/219 |

FOREIGN PATENT DOCUMENTS

| | | | |
|---|---|---|---|
| 2461617 | 7/1975 | Fed. Rep. of Germany | 206/219 |
| 2412410 | 9/1975 | Fed. Rep. of Germany | 206/219 |
| 2658637 | 7/1977 | Fed. Rep. of Germany | 405/261 |

*Primary Examiner*—Henry F. Epstein
*Assistant Examiner*—P. J. Ryan
*Attorney, Agent, or Firm*—Lowe, Price, Leblanc, Becker & Shur

[57] ABSTRACT

A system for securely offixing to a structure at a recess therein comprises a container body filled with a main component and sealed with a cap formed in part by solidifying a hardening agent and an inorganic material with a solidifying agent. The cap may be formed by confining a hardening agent in a film or coated film of plastics. The container body is further subjected to flaw or strain working or otherwise formed to be weakened so as to break into small pieces when subjected to a force by the element. The main component and the hardening agent then react, within the recess, to securely affix the element to the structure. In another aspect of the invention, a method is provided for retaining the first component in its frangible container with a cap comprising the reactive or hardening agent for placement in a recess of the structure for forcible breakage of the container, a reaction and secure affixation by the reaction product.

23 Claims, 2 Drawing Sheets

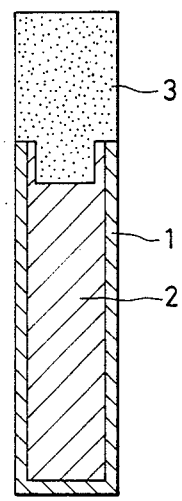
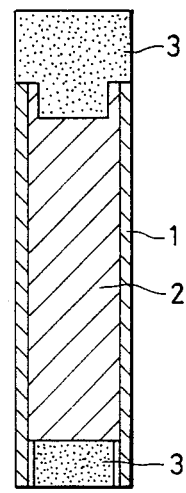
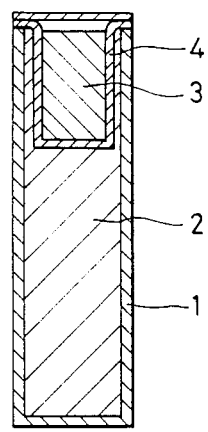

FIG. 4 　FIG. 5 　FIG. 6
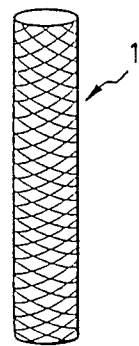 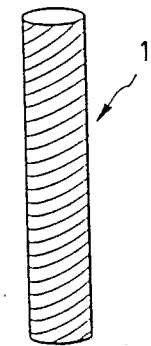 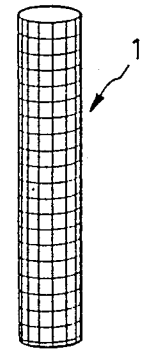
FIG. 7 　FIG. 8 　FIG. 9 　FIG. 10 PRIOR ART
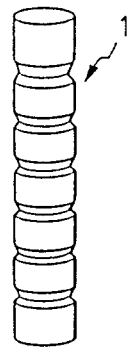 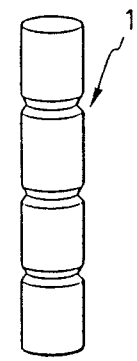 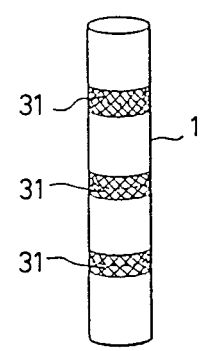 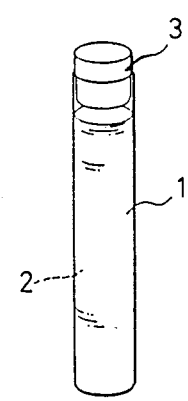

SYSTEM AND METHOD FOR SECURELY AFFIXING AN ELEMENT TO A STRUCTURE

BACKGROUND OF THE INVENTION

1. Field of the Invention

The present invention relates to a system and method for securely affixing an element to a structure.

2. Statement of the Prior Art

When post-working anchor bolts or displays are mounted on a structure of reinforced concrete, ect., the body material is provided with bores in which they are fixedly secured by means of metal expansion, bonding agent pouring a capsule bonding type techniques. The metal expansion type technique is a simple operation involving mere driving-in of bolts, but tends to cause large deformation relative to load, and is inferior in terms of strength. On the other hand, the bonding agent pouring technique is troublesome to execute. For these reasons, the capsule bonding type technique now finds wide use. According to this technique, a capsule in which two components, i.e., a main component and a hardening component or agent separately contained, is inserted into a bore formed in an application structure. Then, an anchor bolt or the like is inserted into that capsule and rotated, struck a blow with a hammer, ect., to agitate and mix the two components for hardening. In this manner, the anchor bolt or the like is generally fixedly secured to the application structure.

With the capsule bonding technique, however, it is required to rotate the anchor bolt or the like so as to agitate and mix the main and hardening components, hence it is impossible to use many types of anchor bolts such as flattened, conically cut, L-shaped and hooked ones, and it is necessary to adapt the extreme end shape of an anchor bolt or the like for mixing.

There is now desired the bonding type capsule which permits not only ordinary anchor bolts but also many shaped anchor bolts such as flattened, conically cut, L-shaped and hooked ones to be fixedly bonded to an application structure only by driving them thereinto with a hammer or the like but with no need for rotating them.

Containers of resin capsules used for post-working anchoring have heretofore been formed of glass, ceramics or plastics, as shown in FIG. 10. Alternatively, a separate container filled with a hardening component has been embedded in the main component. In FIG. 10, reference numerals 1, 2 and 3 stand for a container body, a main component and a cap, respectively.

When such conventional resin capsules are driven into an application bore by means of a hammer, etc; the containers formed of glass, ceramics or plastics are not sufficiently finely divided so that they remain on the application surface of that bore in the form of large pieces. This is considerably responsible for a reduction in the strength of bonding of the binders to the body material or to the anchor bolts on the joint area thereof.

SUMMARY OF THE INVENTION

A main object of the present invention is to provide a system for securely affixing an element to an application structure, which can eliminate the aforesaid problems occurring with the prior art.

In order to solve the aforesaid problems and achieve the objects of the present invention, in a preferred embodiment of this invention, a system for securely affixing an element to a structure comprises a generally cylindrical container is formed of glass or ceramics to contain a main bonding component, and an opening in the container sealed with a cap formed by solidifying a hardening agent and an inorganic material with a solidifying agent or a cap formed by confining a hardening component within a plastic film or coated film.

According to another aspect of the present invention, the present capsule is characterized in that the container body is formed of glass or ceramics and has a cylindrical form open at one end of both ends, and is further subjected to flaw or strain working.

According to yet another aspect of the invention, a method is provided for containing, locating and applying a mixture of materials to form a hard bond for securely affixing an element to a structure.

BRIEF DESCRIPTION OF THE DRAWINGS

The present invention will now be explained with reference to the preferred embodiments thereof as illustrated in the accompanying drawings, which are given for the purpose of illustration alone, and in which:

FIG. 1 is a sectional view of the first embodiment of the capsule according to the present invention, FIG. 2 is a sectional view of the third embodiment of the capsule according to the present invention, FIG. 3 is a sectional view of the fourth embodiment of the capsule according to the present invention, FIGS. 4 to 6 are perspective views of the containers of the capsules according to the present invention, which are subjected to the flaw and strain working, FIGS. 7 and 8 are perspective view of the containers subjected to drawing or constricting, FIG. 9 is a perspective view of the embodiment in which a hardening component is fixedly filled in the constricted portion, and FIG. 10 is a perspective view of one type of resin capsule used for the conventional post-working anchor.

Throughout the drawings, reference numerals 1, 2, 3 and 4 stand for container body, main component, cap filled with a hardening component and cap body, respectively.

DETAILED DESCRIPTION OF THE INVENTION

In the present disclosure, by the term "flaw working" is meant the forming of fine flaws or grooves on a container by a glass processing tool such as diamond, or by treating the surface thereof with a hydrofluoric acid solution, etc. The term "strain working" the working means for making use of a difference in the coefficient of expansion between a glass tube and a glass coating material printed on the surface thereof in the form of grids, etc., to produce strong tensile stress on the printed portion of the glass coating material, or drawing or constricting a glass tube, thereby straining a container. It is to be understood that a lead-filled glass coating material of the like is best-suited for the aforesaid glass coating material. It is also to be noted that the shape of flaws or the printed form of the glass coating material may optionally be selected from grids, lines, spirals, patterns, characters, figures and the like. For the purpose of this invention, the flaw working may be carried out in combination with the strain working, and vice versa. For instance, the container may be drawn or constricted and, at the same time, may be coated with the glass coating material to strain it. Alternatively, the container may be drawn and, at the same time, may be flawed with cuts or scratches made thereon with a diamond. The container may be formed of glass or ceramics in the cylindrical form open at one end or both ends.

A body of the thus formed container contains the main component, and has its opening or openings sealed with a cap obtained by solidifying a hardening agent and an inorganic material with a solidifying agent or by confining or enclosing a hardening agent within a plastic film or coated film.

The main component is composed mainly of a two-component resin of the type that is hardened by a hardening agent. As for the resin, use may be made of unsaturated polyester resin, methacrylate resin, epoxy acrylate resin, epoxy resin and the like. The main component may be composed of these resins, and may further contain various inorganic materials such as calcium carbonate powders or silica sand particles.

The hardening agents used in the present invention may include peroxides used for unsaturated polyester resin, etc. such as benzene peroxide and various amines and acid anhydrides used for epoxy resin, etc. The hardening agents may be used alone or in combination with various inorganic materials.

The inorganic materials used may include powdery stone, talc, calcium carbonate, gypsum and the like, or aggregates having a diameter of 2 mm and less such as silica sand.

The aforesaid cap may be formed by the solidification of said hardening agent and inorganic material with a solidifying agent.

As the solidifying agents, starch paste, lactose and other chemical paste agents or inorganic bonding agents such as calcined gypsum may be used. Calcined gypsum reacts with water to give gypsum which can be used as the aforesaid inorganic material.

The aforesaid hardening agent, inorganic material and solidifying agent are mixed together, and the mixture is molded into cap.

A cap in which the hardening agent is confined in a cap container conveniently formed of a plastic film or a plastic-coated film is formed by either of the following two methods.

According to the first method, the plastic film is formed into a cap which then receives the hardening agent in its recess. An aluminium foil-laminated plastic film is thermally fused or bonded to an opening in the cap for sealing purposes.

According to the second method, the aforesaid hardening agent and inorganic material are solidified by the solidifying agent into a cap. The cap is then coated on its surface to form a coated film within which the hardening agent and inorganic material are confined.

Various coating materials may be used to this end, including for instance, unsaturated polyester resin methacrylate resin, epoxy acrylate resin and epoxy resin coating materials as well as alkyd resin coating materials.

First Embodiment

FIG. 1 is a sectional view of the first embodiment of the capsule according to the present invention. Forty (40) parts of a 30% diluted product of benzene peroxide acting as the hardening component were sufficiently mixed with 30 parts of calcium carbonate acting as the inorganic material and 10 parts of starch paste and water acting as the solidifying agent, and the mixture was placed in a mold to prepare the cap 3 in the cylindrical form comprising one portion of 9.5 mm in diameter and 7 mm in height and the other portion of 10.5 mm in diameter and 25 mm in height. Unsaturated polyester resin was filled as the main component 2 to a height of 45 mm in the glassy container body 1 having a diameter of 10.5 mm (an inner diameter of 9.5 mm) and a height of 55 mm, and the body 1 was then sealed with the previously formed cap 3 to obtain a capsule.

On the other hand, a bore of 11.5 mm in diameter and 80 mm in depth was formed in concrete having a compression strength of 210 kg/cm$^2$, and was cleaned inside. Then, the capsule was inserted on the side opposite to the cap 3 into that bore, and a flat deformed bar (D 10) of 500 mm in length (not shown) was thereafter driven onto the bottom of the bore by means of a hammer. After hardening and curing for 3 hours a tensile strength of 2100 kg was obtained as a result of tensile testing.

Apart from this experiment, a flat deformed bar (D10) (not shown) was fixed in a bore formed in a transparent resin molding in the same manner as mentioned above. As a result, it was clearly observed that the capsule according to the present invention was uniformly pulverized and mixed.

Second Embodiment

Thirty (30) parts of a 30% diluted product of benzene peroxide acting as the hardening agent were sufficiently mixed with 40 parts of No. 4 silica sand acting as the inorganic material, 20 parts of calcined gypsum acting as the solidifying agent and 10 parts of water. With the mixture, the cap 3 filled with the hardening agent was formed in the same manner as described in the first embodiment to obtain a similar capsule.

The same testing as described in the first embodiment was carried out with this capsule. As a result, a tensile strength of 2400 Kg was obtained.

Third Embodiment

FIG. 2 is a sectional view of the third embodiment of the capsule according to the present invention. Sixty (60) parts of a 30% diluted product of benzene peroxide acting as the hardening agent were sufficiently mixed with 30 parts of calcined gypsum and 10 parts of water which acted as an inorganic material-solidifying agent combination to prepare a first hardening agent-filled cap 3 in the cylindrical form comprising one portion of 9.5 mm in diameter and 7 mm in height and the other portion of 10.5 mm in diameter and 25 mm in height, and a second hardening agent-filled cap 3 in the cylindrical form of 9.5 mm in diameter and 7 mm in height. The container body 1 formed of glass open on its both sides was sealed on one side with the second cap 3. The main component acrylate resin was filled to a height of 55 mm in the container body, which was in turn sealed with the first cap 3.

With the capsule inserted into an application bore with the first cap up, the same testing as described in the first embodiment was carried out. As a result, a tensile strength of 2400 kg was obtained. When a flat deformed bar (D10) was fixed in a bore formed in a transparent resin molding in the same manner as described in the first embodiment, it was clearly observed that the capsule according to the present invention was uniformly divided and mixed.

Fourth Embodiment

FIG. 3 is a sectional view of the fourth embodiment of the capsule according to the present invention. A mixture of 50 parts of a 25% diluted product (powders) of benzene peroxide acting as the hardening agent with 50 parts of No. 4 silica sand acting as the inorganic material was filled to a height of 23 mm in a collared cap container 4 of plastics having an outer diameter of 9.5 mm and a thickness of 0.15 mm. The cap 4 was then thermally sealed with a laminated film comprising polyethylene and an aluminium foil (not numbered) to form a hardening agent-filled cap. Unsaturated polyester resin acting as the main component 2 was filled to a height of 45 mm in the container body 1 of glass having a diameter of 10.5 mm (an inner diameter of 9.5 mm) and a height of 55 mm, which was then sealed with the previously formed cap to obtain a capsule.

With this capsule, the same testing as described in the first embodiment was conducted. As a result, a tensile strength of 1800 kg was obtained.

When a flat deformed bar (D10) was fixed in a bore formed in a transparent resin shape in the same manner as described in the first emobidment, it was clearly observed that the capsule according to the present invention was finely divided and mixed.

Fifth Embodiment

A 50% diluted product of pasty benzene peroxide acting as the hardening agent was filled to a height of 23 mm in a collared cap container 4 of plastics, which was in turn thermally sealed with a laminated film comprising polyethylene and an aluminium foil to form a hardening agent-filled cap. A mixture of equal amounts of polyester resin and calcium carbonate acting as the main component 2 was filled to a height of 55 mm in the container body 1 of glass having a diameter of 10.5 mm (an inner diameter of 9.5 mm) and a height of 80 mm, which was then sealed with the previously formed cap to obtain a capsule.

With this capsule, the same testing as described in the first embodiment was conducted. As a result, a tensile strength of 1600 kg was obtained.

Sixth Embodiment

FIG. 4 is a perspective view of the container body of the capsule according to the present invention. The container body was a container of glass in the form of a bottomed cylinder having a diameter of 10.5 mm (an inner diameter of 9.5 mm) and a height of 60 mm, which was formed on the outer side with a grid array of grooves having a depth of 0.3 mm at an interval of 3 mm with the use of diamond. The main component methacrylate resin was filled to a height of 50 mm in this container. On the other hand, twenty (20) parts of a 50% diluted product of benzene peroxide acting as the hardening agent were sufficiently mixed with 4 parts of self-hardening calcium silicate, and the mixture was placed in a mold at a pressure of 300 kg/cm² to form a hardening agent-filled cap in the cylindrical form having a diameter of 9.5 mm and a height of 15 mm. The main component-filled container was sealed with the hardening agent-filled cap to form a capsule.

On the other hand, a bore of 12 mm in diameter and 80 mm in depth was formed in concrete of 210 kg/cm² in compression strength, and was cleaned inside. With the capsule inserted into the bore with the cap up, a flat deformed bar (D 10) of 500 mm in length was driven onto the bottom of the bore with a 3 lb. hammer. As a result of tensile strength performed after hardening and curing at 20° C. for 24 hours, a tensile strength of 3100 kg was obtained. When a flat deformed bar (D10) was fixed in a bore formed in a transparent resin molding in the same manner as described in the first embodiment, it was clearly observed that the glass of the capsule container of the sixth embodiment was uniformly divided and mixed.

Comparative Embodiment

With a conventional capsule container of glass which was not subjected to any working, a capsule was prepared in the same manner as described in the sixth embodiment.

Then, a flat deformed bar (D10) was fixed in the same manner as described in the sixth embodiment to carry out tensile testing. As a result, a tensile strength of 2400 kg was obtained. When a flat deformed bar (D10) was fixed in a bore formed in a transparent resin molding in the same manner as mentioned above, several glass pieces of a size of about 5 mm × 10 mm were found.

Seventh Embodiment

Obtained from a glass tube for ampules (of 10.5 mm in diameter and 9.5 mm in inner diameter) having a coefficient of linear expansion of $53 \times 10^{-7}$, a softening temperature of 775° C. and an annealing temperature of 560° C. was a glass container of 60 mm in height. By means of known screen printing, grids were printed at an interval of 3 mm on the surface of the glass container with a glass coating material having a coefficient of linear expansion of $90 \times 10^{-7}$ and a softening temperature of 460° C. (and consisting 45% of lead oxide, 25% of silica sand, 8% of boron oxide, 18% of an opacifier and 4% of an alkali metal oxide). The thus treated glass container was heated at 620° C. that was the annealing temperature for several days for fusion of the glass coating material, and was cooled down to normal temperature. Due to a difference in the coefficient of expansion between the glass tube for ampules and the glass coating material, strong tensile stress was then exerted on the printed portion of the glass coating material to strain the glass container.

With the container of the seventh embodiment, a capsule was prepared in the same manner as described in the sixth embodiment, and was used to carry out the same testing as described in the sixth embodiment. As a result, a tensile strength of 3000 kg was obtained. When a flat deformed bar (D10) was fixed in a bore formed in a transparent resin molding in the same manner as described in the sixth embodiment, it was clearly observed that the glass of the capsule container of the seventh embodiment was finely divided and mixed therewith.

Eighth And Ninth Embodimemts

FIG. 5 is a perspective view of the eighth embodiment in which spirals were formed in place of the grids of the 6th embodiment and the container was made of ceramics, and FIG. 6 is a perspective view in which the array of the grids of the 6th embodiment was changed to an different array and the container was made of ceramics for the ninth embodiment. With the containers of the 8th and 9th embodiments, capsules were formed in the same manner as described in the 6th embodiment. When flat deformed bars (D10) were fixed in bores formed in transparent resin moldings as the same manner as described in the 6th embodiment, it was clearly observed that the ceramics of both the containers were finely divided and mixed therewith.

Tenth And Eleventh Embodiments

FIGS. 7 and 8 are perspective views of the containers of the capsules according to the 10th and 11th embodiments. The containers were each formed of glass in the bottomed cylindrical form having a diameter of 10.5 mm (an inner diameter of 9.5 mm) and a height of 60 mm, and were provided with six constrictions in the 10th embodiment and three constrictions in the 11th embodiment. According to the 10th embodiment, the glass coating material used in the 7th embodiment was further applied and fused to the constrictions to strain the container. With the container of the 10th and 11th emboidments, capsules were made in the same manner as decribed in the 6th embodiment, and flat deformed bars (D10) were fixed in bores formed in transparent resin moldings in the same manner as described in the 6th embodiment. As a result, it was clearly ascertained that the glass of both containers was uniformly and finely divided and mixed.

FIG. 9 is a perspective view of the 11th embodiment in which a hardening agent 31 was fixedly filled in the constrictions. For a cap used with such a container, however, the hardening agent-filled cap 3 is not necessarily used, and an ordinary cap formed or plastics, etc. and containing no hardening agent may be used.

Effects Of The Invention

The fixing element-fixing capsule according to the present invention is constructed as mentioned above, and has the following many advantages over the prior art ones.

1. Rotating and the application of blows have been needed for use of the conventional bonding type capsules. However, the capsule according to the present invention can be utilized with a structure only by applying a blow without recourse to any double nut or washer for fixing a screw bolt or any electrically driven hammer drill. Therefore, the step of fixing the capsule is simplified.

2. The cost for producing the capsule can be reduced considerably. In other words, while the conventional bonding type capsule is formed of a glass container having a length of, say, 80 mm, the bonding type capsule according to the present invention can essentially the same performance with a glass container as short as 50 mm in length. This is because the inorganic material or hardening agent container heretofore placed in the main component is not placed in the container body, and is formed into a cap. Moreover, while the conventional process involves a first step of placing resin in the glass container, a second step of placing a hardening agent-filled glass tube therein, a third step of filling an aggregate material therein and a fourth step of encapping the glass container, the present process comprises only two steps, the first of filling resin in the glass container and the second of encapping it. Thus, the present process involves a reduced number of steps, and can be carried out at reduced costs.

3. According to the present invention, only a blow needs to be given to the anchor bolt with a hammer, etc. with no need for rotating it. It is thus possible to form a bore of a reduced diameter in a structure comprising concrete with improved workability. For instance, while a screw bolt (M10) used in the prior art requires a bore of 13 mm in diameter, similar results will be obtained with a bore of 11.5 to 12 mm in diameter in the present invention. Similarly, while a deformed bar (D10) used in the prior art requires a bore of 13 mm, similar results will be obtained with a bore of 11.5 to 12 mm in diameter with the present invention.

4. Since a bore of a smaller diameter can be used in the present invention, the amount of adhesives needed for the anchor bolt also can be reduced. Therefore, a sufficient bonding force can be obtained with a smaller capsule and at lower costs.

5. Referring to the anchor bolt used in the present invention, sufficient results will be obtained with an anchor bolt having a flat end with improved workability. Unlike the prior art, it is not necessary to apply an anchor bolt having an inclined end designed for sufficient mixing.

6. Since the resin capsule is constructed as mentioned in the foregoing, when the anchor bolt is driven with a hammer, etc. for execution, the cylindrical container formed of glass or ceramics, that is the container of the resin capsule, can easily be finely divided and sufficient anchor strength thereby can be attained.

The preceding descriptions are set forth to illustrate specific embodiments of the invention and are not intended to limit the scope of the system and method of the present invention. Additional embodiments and advantages within the scope of this invention will be apparent to one of ordinary skill in the art in view of the appended claims.

What is claim is:

1. A system for securely affixing an element to a structure formed to have a recess for receiving therein an affixation portion of said element, comprising:
   frangible first containment means formed of a first material, for containing a quantity of a second material, and shaped and sized for placement and subsequent breakage thereof inside said recess by a force applied thereto by said affixation portion also received in said recess; and
   a second containment means comprising a quantity of a third material, cooperating with said first containment means to contain said second material therein until said breakage of said first containment means and for enabling a reaction between said second and third materials upon occurrence of said breakage to form a reaction product securely affixing said affixation portion of said element to said structure in said recess.

2. A system according to claim 1, wherein:
   said first containment means is formed to have a structurally weakened portion to facilitate easy breakage thereof into small pieces under the action of said force.

3. A system according to claim 2, wherein:
   said weakened portion comprises a plurality of grooves formed in a predetermined pattern on a surface of said first containment means.

4. A system according to claim 3, wherein:
   said grooved surface comprises a pattern of externally applied scratches.

5. A system according to claim 3, wherein:
   said grooved surface comprises a pattern of chemically etched flaws.

6. A system according to claim 2, wherein:
   said weakened portion comprises an external surface strained by application thereto of a fourth material having a different coefficient of expansion than said first material.

7. A system according to claim 6, wherein:
said weakened portion comprises a plurality of grooves formed in a predetermined pattern on a surface of said first containment means.

8. A system according to claim 7, wherein:
said first containment means comprises a wall portion weakened by being drawn thin.

9. A system according to claim 8, wherein:
said weakened portion comprises a plurality of grooves formed in a predetermined pattern on a surface of said first containment means.

10. A system according to claim 2, wherein:
said first containment means comprises a constricted wall portion.

11. A system according to claim 1, wherein:
said first containment means is formed to have an opening and said second containment means is formed as a cap to seal said opening to contain said second material inside said first containment means until said breakage thereof.

12. A system according to claim 1, wherein:
said second containment means is formed to have a surface comprising a film preventing said reaction until said breakage.

13. A capsule system for securely affixing an element to a structure formed to have a recess for receiving therein an affixation portion of said element, comprising:
frangible containment means formed of a first material, for containing a quantity of a second material and shaped and sized for placement and subsequent breakage thereof inside said recess by a force applied thereto by said affixation portion also received in said recess; and
a second containment means comprising a quantity of a third material, cooperating with said first containment means to contain said second material therein until said breakage of said first containment means and for enabling a reaction between said second and third materials upon occurrence of said breakage to form reaction product securely affixing said affixation portion of said element to said structure in said recess, wherein said second containment means is formed to have a surface comprising a film preventing said reaction until said breakage, and wherein said film comprises a plastics material.

14. A system according to claim 13, wherein:
said film further comprises aluminum foil.

15. A capsule system for securely affixing an element to a structure formed to have a recess for receiving therein an affixation portion of said element, comprising:
frangible first containment means formed of a first material, for containing a quantity of a second material and shaped and sized for placement and subsequent breakage thereof inside said recess by a force applied thereto by said affixation portion also received in said recess; and
a second containment means comprising a quantity of a third material, cooperating with said first containment means to contain said second material therein until said breakage of said first containment means and for enabling a reaction between said second and third materials upon occurrence of said breakage to form a reaction product securely affixing said affixation portion of said element to said structure in said recess, wherein said first material comprises a material selected from a group of materials including glass and ceramics.

16. A capsule system for securely affixing an element to a structure formed to have a recess for receiving therein an affixation portion of said element, comprising:
frangible first containment means formed of a first material, for containing a quantity of a second material and shaped and sized for placement and subsequent breakage thereof inside said recess by a force applied thereto by said affixation portion also received in said recess; and
a second containment means comprising a quantity of a third material, cooperating with said first containment means to contain said second material therein until said breakage of said first containment means and for enabling a reaction between said second and third materials upon occurrence of said breakage to form a reaction product securely affixing said affixation portion of said element to said structure in said recess wherein said second material comprises unsaturated polyester resin.

17. A system according to claim 16, wherein:
said third material comprises a mixture of 40 parts of a 30 percent diluted product of benzene peroxide, 30 parts of calcium carbonate and 10 parts of starch paste and water.

18. A system according to claim 16, wherein:
said third material comprises a mixture of 30 parts of a 30 percent diluted product of benzene perodixe, 40 parts of No. 4 silica sand, 20 parts of calcined gypsum and 10 part of water.

19. A system according to claim 16, wherein:
said third material comprises 60 parts of a 30 percent diluted product of benzene peroxide, 30 parts of calcined gypsum and 10 parts of water.

20. A system according to claim 16, wherein:
said third material comprises a mixture of 50 parts of a 25 percent diluted powdered product of benzene peroxide and 50 parts of No. 4 silica sand.

21. A capsule system for securely affixing an element to a structure formed to have a recess for receiving therein an affixation portion of said element, comprising:
frangible first containment means formed of a first material, for containing a quantity of a second material and shaped and sized for placement and subsequent breakage thereof inside said recess by a force applied thereto by said affixation portion also received in said recess; and
a second containment means comprising a quantity of a third material, cooperating with said first containment means to contain said second material therein until said breakage of said first containment means and for enabling a reaction between said second and third materials uypon occurrence of said breakage to form a reaction product securely affixing said affixation portion of said element to said structure in said recess, wherein said second material comprises equal amounts of polyester resin and calcium carbonate and said third material comp4rises a mixture of 50 percent diluted product of pasty benzene peroxide.

22. A capsule system for securely affixing an element to a structure formed to have a recess for receiving therein an affixation portion of said element, comprising:

frangible first containment means formed of a first material, for containing a quantity of a second material and shaped and sized for placement and subsequent breakage thereof inside said recess by a force applied thereto by said affixation portion also received in said recess; and a second containment means comprising a quantity of a third material, cooperating with said first containment means to contain said second material therein until said breakage of said first containment means and for enabling a reaction between said second and third materials upon occurrence of said breakage to form a reaction product securely affixing said affixation portion of said element to said structure in said recess, wherein said weakened portion comprises an external surface strained by application thereto of a fourth material having a different coefficient of expansion than said first material, and said first material comprises glass having a coefficient of linear expansion of $53 \times 10^{-7}$ and consisting of 45 percent lead oxide, 25 percent silica sand, 8 percent boron oxide, 18 percent of an opacifier and 4 percent of an alkali metal oxide.

23. A system according to claim 22, wherein:

said first glass container is annealed at 620° C. to obtain fusion of said fourth material to said first material.

* * * * *